US006637934B1

(12) United States Patent
Henderson et al.

(10) Patent No.: US 6,637,934 B1
(45) Date of Patent: Oct. 28, 2003

(54) CONSTANT OFFSET BUFFER FOR REDUCING SAMPLING TIME IN A SEMICONDUCTOR TEMPERATURE SENSOR

(75) Inventors: Richard Dean Henderson, Sunnyvale, CA (US); Mehmet Aslan, Milpitas, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/051,394

(22) Filed: Jan. 16, 2002

Related U.S. Application Data

(60) Provisional application No. 60/325,696, filed on Sep. 27, 2001.

(51) Int. Cl.[7] ................................................ G01K 7/01
(52) U.S. Cl. ...................... 374/178; 374/170; 326/82; 327/512
(58) Field of Search ................................ 374/178, 170, 374/163, 168, 183, 120; 327/512; 326/82

(56) References Cited

U.S. PATENT DOCUMENTS

| | | | | |
|---|---|---|---|---|
| 4,232,271 A | * | 11/1980 | Dobkin et al. | 330/258 |
| 4,497,586 A | * | 2/1985 | Nelson | 374/178 |
| 4,627,745 A | * | 12/1986 | Rider | 374/168 |
| 4,636,092 A | * | 1/1987 | Hegyi | 374/178 |
| 5,195,827 A | * | 3/1993 | Audy et al. | 374/178 |
| 5,519,354 A | * | 5/1996 | Audy | 327/512 |
| 5,639,163 A | * | 6/1997 | Davidson et al. | 374/178 |
| 5,982,221 A | * | 11/1999 | Tuthill | 374/178 |
| 6,097,239 A | * | 8/2000 | Miranda, Jr. et al. | 374/178 |
| 6,149,299 A | | 11/2000 | Aslan et al. | 374/178 |
| 6,169,442 B1 | * | 1/2001 | Meehan et al. | 327/512 |
| 6,252,209 B1 | * | 6/2001 | Liepold | 219/501 |
| 6,332,710 B1 | | 12/2001 | Aslan et al. | 374/183 |
| 6,480,127 B1 | * | 11/2002 | Aslan | 374/183 |
| 6,554,469 B1 | * | 4/2003 | Thomson et al. | 374/178 |

OTHER PUBLICATIONS

Bakker, A.; Thiele, K.; Huijsing, J.H., "A CMOS nested-chopper instrumentation amplifier with 100–nV offset," Solid–State Circuits, IEEE Journal of, (35:12), Dec. 2000, pp. 1877–1883.*

Bakker, A.; Thiele, K.; Huijsing, J., "A CMOS nested chopper instrumentation amplifier with 100 nV offset," Solid–State Circuits Conf, 2000, Digest, ISSCC. 2000 IEEE Int'l, 2000 (no month), pp. 156–157.*

Bakker, A.; Huijsing, J.H., "Micropower CMOS temperature sensor with digital output," Solid–State Circuits, IEEE Journal of, vol. 31, Iss. 7, Jul. 1996, pp. 933–937.*

(List continued on next page.)

*Primary Examiner*—Diego Gutierrez
*Assistant Examiner*—Stanley J. Pruchnic, Jr.
(74) *Attorney, Agent, or Firm*—Merchant & Gould, PC; Mark R. Hennings

(57) ABSTRACT

A data acquisition system for sampling a temperature signal from a temperature sensor includes: a programmable current source, a buffer with a constant offset, and an analog-to-digital converter (ADC). The programmable current source selectively provides bias currents to the temperature sensor, which produces response voltages in response to the applied bias current. The buffer receives the response voltages and produces buffered response voltages that include a constant offset. The ADC is arranged to produce digital codes in response to the buffered response voltages. The digital codes are used to determine a temperature associated with the temperature sensor. The buffer isolates the temperature sensor from the ADC such that loading effects are minimized and set-up times for the conversion are minimized.

19 Claims, 6 Drawing Sheets

OTHER PUBLICATIONS

Bakker, A.; Huijsing, J.H., "Offset reduction in currentmode microsystems," Circuits and Systems, 1996. ISCAS '96., 'Connecting the World', 1996 IEEE Int'l Symp., vol. 4, May 12–15, 1996, pp. 344–347.*

Williams, Jim, "IC instrumentation amp enhances transducer measurements," Electronic Design, vol. 29, No. 16, Aug. 6, 1981, pp. 203–206.*

Koch, Cameron J., "Diode or transistor makes fully linear thermometer,", Electronics, May 13, 1976, pp. 110–112.*

"8–Lead, Low–Cost, System Temperature Monitor ADM1020," Analog Devices, Inc., 1999, pp. 1,5–6.

"Low–Cost Microprocessor System Temperature Monitor ADM1021A," Analog Devices, Inc., 2001, pp. 1,5–7.

"System Monitor and Fan Controller For Low–Noise PCs ADM1027," Analog Devices, Inc., 2001, pp. 1,14–17.

"±1°C Remote and Local System Temperature Monitor ADM1032," Analog Devices, Inc., 2001, p. 1,5.

"Remote/Local Temperature Sensor with SMBus Serial Interface MAX1617," Maxim Integrated Products, Rev 1; 3/98, pp. 1,6–9.

"Remote/Local Temperature Sensor with SMBus Serial Interface MAX1617A," Maxim Integrated Products, Rev 0; 1/99, pp. 1,6–9.

"MIC184 Local/Remote Thermal Supervisor," Micrel, Inc., Nov. 2000, pp. 1,6–7.

"LM83 Triple–Diode Input and Local Digital Temperature Sensor with Two–Wire Interface," National Semiconductor Corporation, Nov., 1999, pp. 1,8 and 17.

"LM84 Diode Input Digital Temperature Sensor with Two–Wire Interface," National Semiconductor Corporation, Jul. 2000, pp. 1,9–10, 14–15.

"LM88 Factory Programmable Dual Remote–Diode Thermostat," National Semiconductor Corporation, Aug. 2001, 9 pgs.

"LM87 Serial Interface System Hardware Monitor with Remote Diode Temperature Sensing," National Semiconductor Corporation, Nov. 2001, pp. 1,8, 17–18.

"LM86 ±1°C Accurate, Remote Diode and Local Digital Temperature Sensor with Two–Wire Interface," National Semiconductor Corporation, Feb. 2002, pp. 1,7, 11–12, 17–19.

"LM90 ±3°C Accurate, Remote Diode and Local Digital Temperature Sensor with Two–Wire Interface," National Semiconductor Corporation, Feb. 2002, pp. 1,7, 11–12, 17–19.

"NE1617A Temperature Monitor for Microprocessor Systems," Philips Semiconductors, Dec. 14, 2001, p. 9.

"Environmental Monitoring and Control Device with Automatic Fan Capability EMC6D100, EMC6D101," Standard Microsystems Corporation, Rev. Nov. 19, 2001, pp. 22–23.

"THMC50 Remote/Local Temperature Monitor and Fan Controller with SMBus Interface," Texas Instruments Incorporated, 1999, pp. 1,2, 17–18.

"THMC10 Remote/Local Temperature Monitor with SMBus Interface," Texas Instruments Incorporated, Dec. 1999, pp. 1,13–14.

A. Bakker and J.H. Huijsing, "High Accuracy CMOS Smart Temperature Sensors," *Kluwer Academic Publishers,* pp. 9–35, 74–77, 106–116, 2000 (No month).

* cited by examiner

CONSTANT OFFSET BUFFER FOR REDUCING SAMPLING TIME IN A SEMICONDUCTOR TEMPERATURE SENSOR

RELATED APPLICATION

This utility patent application claims the benefit under 35 United States Code §119(e) of United States Provisional Patent Application No. 60/325,696 filed on Sep. 27, 2001.

FIELD OF THE INVENTION

The present invention relates to a method and apparatus for electronic temperature sensing. More specifically, the present invention is directed to improving setup times for sampling a voltage from a temperature sensor by using a constant offset buffer to isolate an analog-to-digital converter from the temperature sensor.

BACKGROUND OF THE INVENTION

Temperature sensors are often employed to measure temperatures in a remote system. One type of temperature sensor includes a semiconductor device such as a PN junction. A PN junction conducts a current when forward biased. The PN junction has an associated voltage drop that is determined by the forward bias current and the temperature of the PN junction. Voltage drops across the PN junction are measured for two different forward bias currents. An analog-to-digital converter (ADC) may be employed to convert the voltage drops across the PN junction to digital data. The digital data is recorded and analyzed to determine the temperature of the PN junction.

SUMMARY OF THE INVENTION

The present invention is directed to a data acquisition system for sampling a temperature signal from a temperature sensor that includes a semiconductor sensor. More specifically the present invention is directed towards a method and apparatus that improves setup times for sampling the temperature signal by using a constant offset buffer to isolate sampling transients of an analog-to-digital converter from the temperature sensor.

A data acquisition system for sampling a temperature signal from a temperature sensor includes: a programmable current source, a buffer with a constant offset, and an analog-to-digital converter (ADC). The programmable current source selectively provides bias currents to the temperature sensor, which produces response voltages in response to the applied bias current. The buffer receives the response voltages and produces buffered response voltages that include a constant offset. The constant offset allows the constant offset to be subtracted from successive measurements from a temperature sensor. The ADC is arranged to produce values in response to the buffered response voltages. The values are used to determine a temperature associated with the temperature sensor. The buffer isolates the temperature sensor from the ADC such that loading effects are minimized and set-up times for the conversion are minimized.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

The present invention is directed towards a method and apparatus that improves setup times for sampling the temperature signal from a temperature sensor. The reduction in the setup time advantageously allows for an increased sampling rate by the ADC, an increased input impedance of the ADC, and a larger capacitance for reducing common mode noise present in the voltage responses from the temperature sensors. A constant offset buffer is used to isolate the ADC from the temperature sensor. A buffer having a constant offset of 0 V is preferred, but is more difficult to achieve. A buffer having a constant offset is preferable over a buffer having a variable offset, which can introduce errors that are difficult to correct in the signal to be sampled. Accordingly, the constant offset buffer is used, which provides a constant offset to the response voltages from the temperature sensor. The ADC samples the buffered response voltages, which include the constant offset voltage. The constant offset can be subtracted from the sampled buffered response voltages to provide an accurate indication of the actual response voltages from the temperature sensor. The ADC samples may be used to calculate a temperature of the sensor. By buffering the response voltages from the temperature sensor, long setup times that are due to loading can be avoided. Also, the susceptibility of the remote sensor to noise is minimized.

Figure 1:
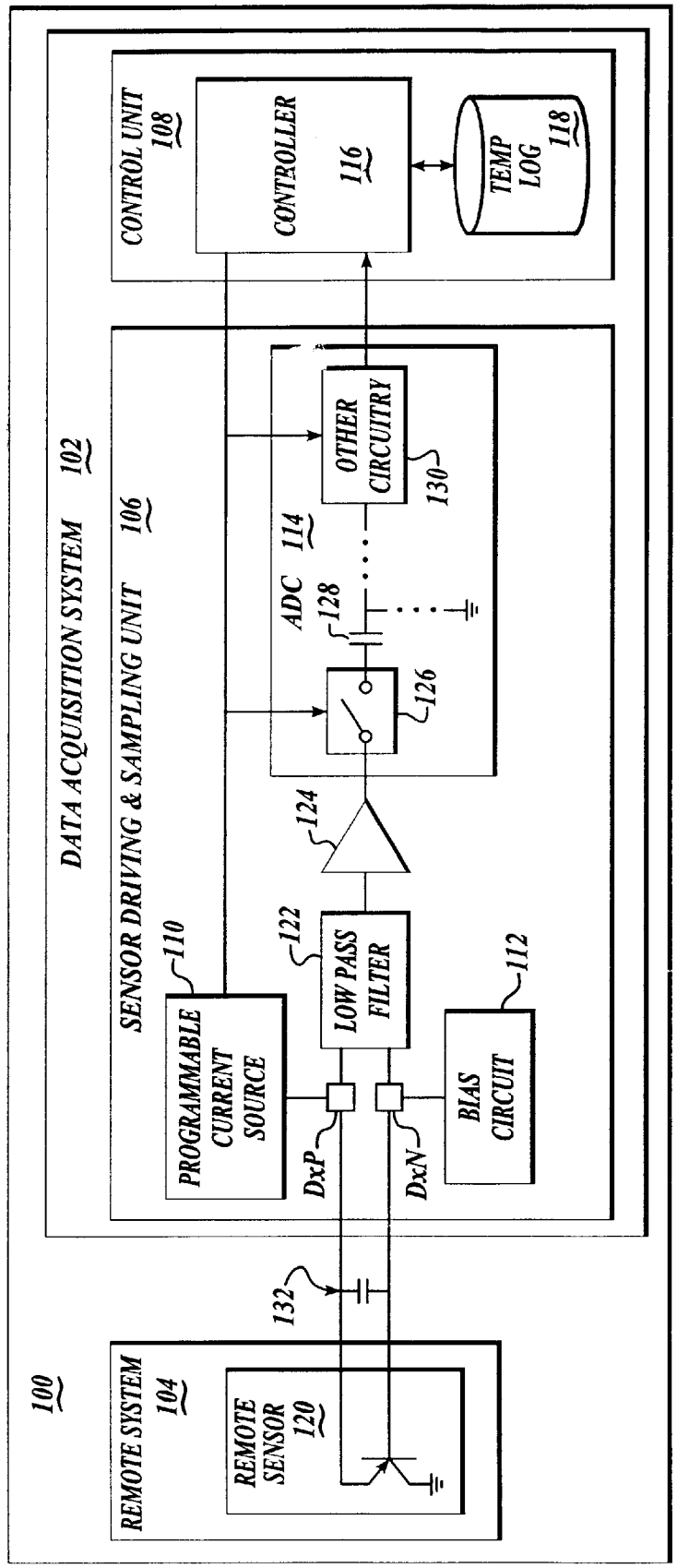
FIG. 1 is a schematic block diagram of an example temperature measurement system that uses a constant offset buffer in accordance with the present invention.

FIG. 1 is a schematic block diagram of an example temperature measurement system that uses a constant offset buffer in accordance with the present invention. The temperature measurement system (100) includes a data acquisition system (102) and a remote system (104). The remote system (104) may be located on the same substrate, or a different substrate, as the substrate that contains the data acquisition system (102). The data acquisition system (102) includes a sensor driving and sampling unit (106) and a control unit (108). The sensor driving and sampling unit (106) includes a programmable current source (110), a bias circuit (112), an analog-to-digital converter (ADC, 114), an optional low pass filter (122), and a constant offset buffer (124). The ADC (114) includes an input switch (126), a capacitor (128), and other circuitry (130). The control unit (108) includes a controller (116) and an optional temperature log (118). The remote system (104) includes a remote sensor (120). An external capacitor (132) is placed between the data acquisition system (102) and remote system (104).

The remote sensor (120) is illustrated as a PNP transistor that has an emitter that is coupled to a node DxP and a base that is coupled to a node DxN. The programmable current source (110) includes an output that is coupled to the node DxP and an input that is coupled to the controller (116). The low pass filter (122) includes a differential input that is coupled to the node DxP and the node DxN, and an output that is coupled to an input of the constant offset buffer (124). The constant offset buffer (124) has an output that is coupled to an input of the ADC (114). The ADC (114) has an output that is coupled to the controller (116). The input switch (126) has an input that is coupled to the output of the constant offset buffer (124), and an output that is coupled to the capacitor (128). The other circuitry functional block (130) has an input that is coupled to the output of the capacitor (128) and an output that is coupled to an input of the controller (116). The bias circuit (112) is coupled to the node DxN. The controller (116) is also coupled to the optional temperature log (118).

In operation, the programmable current source (110) selectively provides at least two different bias currents to the remote sensor (120). The selected bias current is applied to the remote sensor (120), which produces a response voltage that is related to the applied bias current and the temperature of the remote sensor (120). The low pass filter (122) is utilized to reduce system noise and convert the response voltage to a single-supply referenced voltage (a single-ended signal). The first capacitor (132) is employed to reduce differential noise in the system. The constant offset buffer (124) adds a constant offset voltage to the response voltage to produce an offset response voltage. The offset response voltage is provided to the ADC (114), which produces values that correspond to the conversion of the offset response voltage. In various embodiments, the ADC (114) may be implemented by a converter such that the values produced by the converter may be processed within an analog environment, a digital environment, or a mixed-signal environment.

The remote sensor (120) contains a PN junction and is forward-biased when the programmable current source (110) applies an appropriate bias current. The bias circuit (112) is employed to provide a proper bias condition for the remote sensor (120). The applied current and the voltage applied to the remote sensor (120) by the bias circuit (112) cause a voltage to develop across the PN junction in the remote sensor (120). The bias circuit (112) acts to establish node DxN to a known potential. In one example, node DxN is connected to ground. In another example, node DxN is connected to a defined reference potential that is provided by the bias circuit (112). The response voltage from the remote sensor (320) is dependent upon the temperature of the PN junction in the remote sensor diode (120), the bias voltage applied to node DxN, and the applied bias current.

The programmable current source (110) contains a plurality of current sources that may be activated either individually or in combination to provide a desired bias current. In one embodiment, two different currents are applied to the remote sensor where the corresponding current levels are related to one another by a ratio that has either an integer or non-integer value. For example, first and second bias currents may be selectively provided to the remote sensor (120), where the first and second currents are related to one another with a ratio of 16 to 1. In this example, the programmable current source (110) may contain 16 individual current sources that each provides an identical current (1x) such that a total current of 16x is achieved when all 16 current sources are activated.

The low-pass filter (122) is an optional circuit that is used to minimize noise levels in the response voltages from the remote sensor (120). Undesirable noise may be induced upon the response voltage from the PN junction by unstable power rails, inductive coupling, capacitive coupling, and the like. The low pass filter (122) may also be used to convert a voltage response that is in differential form to a single-ended voltage that is referenced to ground. The low pass filter (122) may operate independently from, or in conjunction with, the external capacitor (132). The low pass filter (122) may contain active or passive circuit components.

The constant offset buffer (124) adds a constant offset voltage to the response voltage to produce an offset response voltage. The constant offset buffer (124) acts to electrically isolate the remote sensor (120) from the ADC (114). This arrangement allows the input impedance of the ADC (114) to be driven by the output of the constant offset buffer (124). Thus, the programmable current source (110), which provides low-level currents to drive the PN junction, is not also required to drive the input impedance of the ADC (114). This arrangement advantageously decreases the setup time required for the input signal to be sampled by the ADC (114). Additionally the size of the external capacitor (132) may be increased because the programmable current source (110) is isolated from the ADC (114). The performance of the ADC (114) is less sensitive to the value of the external capacitor (132) because the constant offset buffer (124) isolates sampling transient effects of the ADC (114).

Accordingly, the constant offset buffer (124) includes a high impedance input and is capable of high output slew rates for rapidly driving the input impedance of the ADC (114). In addition, the constant offset buffer (124) should only minimally offset the response voltage, and should offset each response voltage by the same amount. The constant offset buffer (124) should offset each response voltage by the same amount because the response voltages of the PN junction to two different applied currents is measured at different points in time to calculate a single temperature. The constant offset voltage applied to the response voltages can be subtracted from the response voltages in order to maximize the accuracy of temperature calculations.

The offset response voltage from each applied current is sampled with the ADC (114). The controller (116) initiates a voltage measurement of the PN junction by signaling the ADC (114) to close the input switch (126). When the input switch (126) is closed, the capacitor (128), which represents the input impedance of the ADC (114), is charged. Other circuitry (130) converts the applied offset response voltage to a digital code, which is sent to the controller (116).

The ADC (114) may be implemented by any type of converter (e.g. flash, successive approximation, and the like) that is capable of performing an analog-to-digital conversion within a required time interval. Where the system noise induced upon the response voltage is low, a sample and hold device may not be necessary at the input of the ADC (114) because the temperature (and the signal that conveys the temperature) typically will not vary rapidly with respect to the sampling rate. A wide range of implementations of the control logic will be suitable.

The controller (116) controls the programmable current source (110) and the ADC (114). The controller (115) may also be configured to calculate a value for the temperature from voltages or digital codes that are provided from the output of the ADC (114). The controller (116) may be implemented as a microprocessor, a microcontroller, hard-wired logic, a state machine, and the like. Mathmatical functions provided by the controller (116) may be implemented as algorithms embodied in software or firmware, implemented using physical devices, or implemented as a combination of both.

Figure 2:
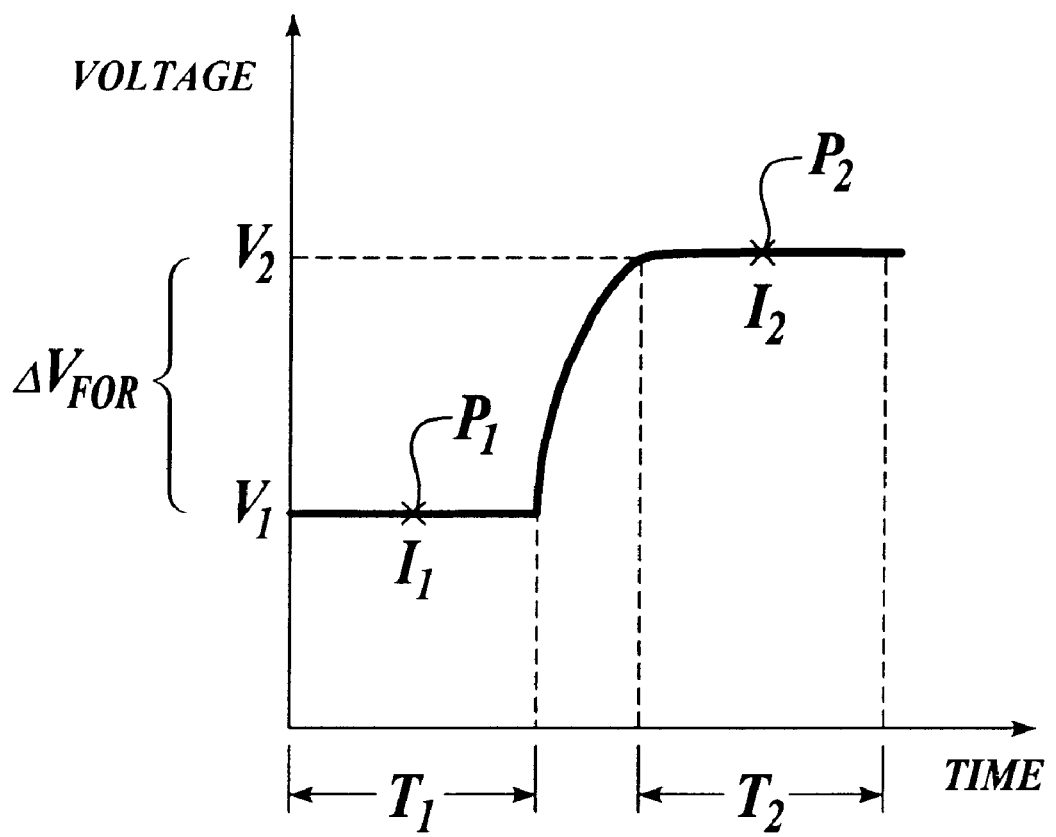
FIG. 2 is a graph illustrating various bias currents that are used to measure a temperature in accordance with the present invention.

FIG. 2 is a graph illustrating the application of two bias currents to the sensor in accordance with the present invention. As shown in FIG. 2, a first bias current (I1) is applied to the remote sensor in a first time interval (T1) to produce a first responsive voltage (V1). A second bias current (I2) is applied to the remote sensor during a second time interval (T2) to produce a second responsive voltage (V2). The difference between the first and second voltages corresponds to $\Delta V_{for}$. The first and second bias currents are related to one another as a ratio. In one example, the ratio of the currents is ten-to-one. In another example, the ratio of the currents is sixteen-to-one.

Temperature measurements of a PN junction in the remote sensor (120) are measured by applying currents, measuring resulting voltages, and calculating a temperature based on the resulting voltages. The programmable current source (110) provides two currents to the PN junction. The currents are applied so that the PN junction in the remote sensor (120) is forward-biased. The resulting voltages across the PN junction from each applied current is sampled with the ADC (114).

In an alternate embodiment, the voltage across the PN junction in the remote sensor (120) may be over-sampled (such that many samples are taken for a selected bias current). The samples may be averaged to reduce the effects of noise and to enhance the accuracy of calculations using values derived by the analog-to-digital *conversions. In one embodiment, samples are typically made at regular intervals such that each sample is separated from other samples by substantially equal time differences. Substantially equal time differences are within 90 percent of a desired value.

Temperature calculations can be determined according to the following formula:

$$T = \frac{q\Delta V_{for}}{\eta K \ln(N)}, \text{ where} \tag{I}$$

where

T=absolute temperature in degrees Kelvin;
q=the charge on the carrier (electron charge);
$\Delta V_{for}$=change in the forward-biased voltage;
K=Boltzmann's constant;
N=ratio of the two applied currents; and
η=ideality factor of the diode.

The ratio (N) can be realized as a combination of area ratios of the PN junctions using a common current, a ratio of currents across two PN junctions that have the same area, or a combination thereof. In the case where the PN junctions have the same area, the change in the forward-biased diode voltage ($\Delta V_{for}$) can be determined by subtracting the measured voltages that resulted by applying two different currents. The two PN junctions ideally should have the same PN junction temperature despite the fact that they cannot exist in the exact same physical location.

Similarly, a value for the ratio (N) can be achieved when only using one PN junction. (The one PN junction may include "stacked diodes" or PN junctions in parallel.) To achieve a value for the ratio (N) when using only one PN junction, two different currents can be successively applied to the one PN junction. Keeping the time between applications of the successive currents relatively small can reduce the magnitude of errors due to temperature drift of the one PN junction.

The use of a constant offset buffer allows the constant offset (which is produced by the constant offset buffer) to be subtracted from successive measurements from a temperature sensor. For a constant offset buffer where $V_{off,N}=V_{off,1}$, the value of the constant offset can be cancelled out when calculating $\Delta V_{for}$ according to the following formula:

$$\Delta V_{for}=(V_{for,N}+V_{off,N})-(V_{for,1}+V_{off,1}) \tag{II}$$

where $V_{for,N}$=Forward junction voltage with N× bias current;
$V_{for,1}$=Forward junction voltage with 1× bias current;
$V_{off,N}$=Buffer offset with input of $V_{off,N}$; and
$V_{off,1}$=Buffer offset with input of $V_{off,1}$.

Thus, $\Delta V_{for}$ can be calculated by the difference of the forward junction voltages where the offset provided by the buffer is a constant.

Figure 3:
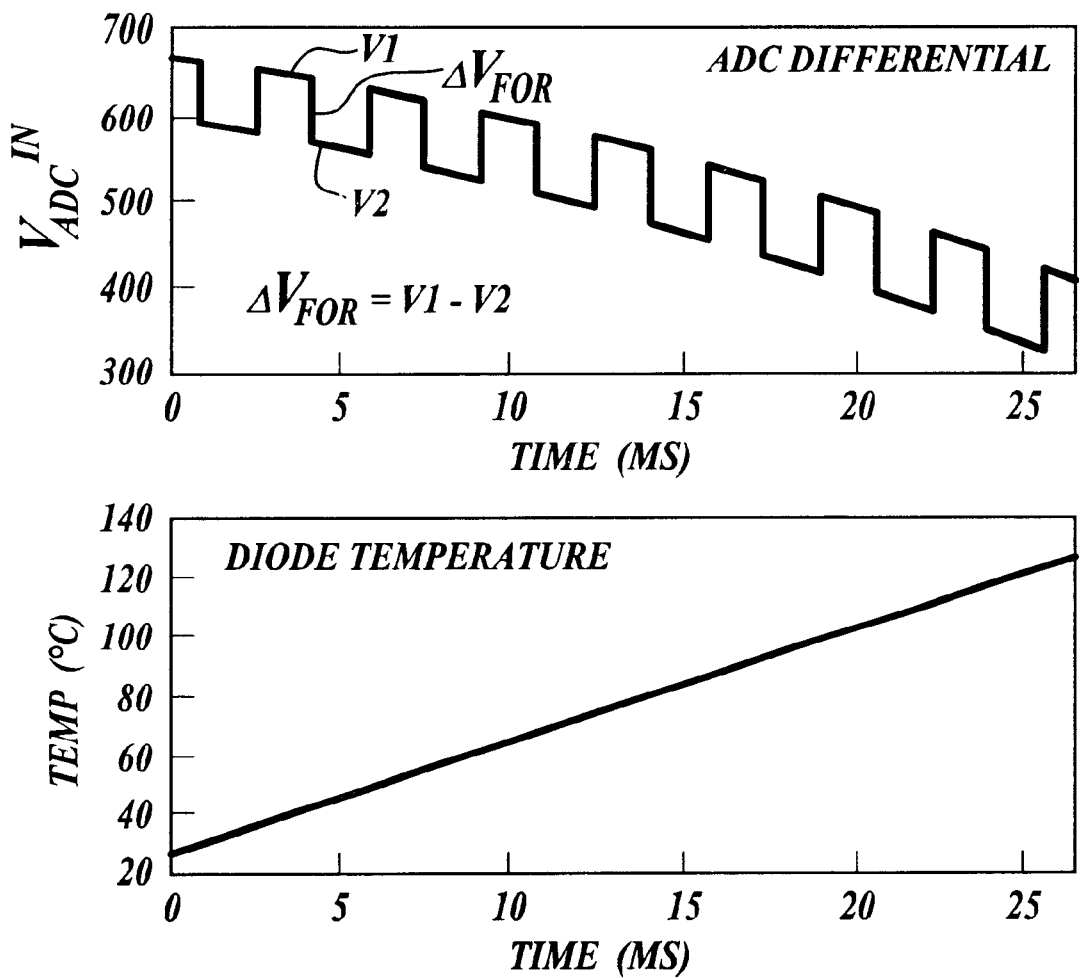
FIG. 3 is a graph illustrating an exemplary voltage produced across a PN junction in a remote sensor as a function of the PN junction temperature and applied current in accordance with the present invention.

FIG. 3 is a graph illustrating exemplary response voltages that are produced by the PN junction in the remote sensor (120) as a function of the PN junction temperature and applied bias current. The graph illustrates generally that the voltage produced across the PN junction in the remote sensor (120) decreases in response to a rise in PN junction temperature. The "square wave" appearance of the voltage signal produced across the PN junction in the remote sensor (120) is the result of applying alternating current densities to the PN junction. For example, a 16× current produces a higher voltage (V1), while a 1× current produces a lower voltage (V2). The combined result of the change in temperature and the alternating current densities produces a change in the height of the "square wave" (i.e., produces a change in $\Delta V_{for}$ as described above with reference to Formula 1). The ratio of applied current densities (16×, here) and the measured voltages can be used to calculate the temperature of the PN junction as previously described.

Figure 4:
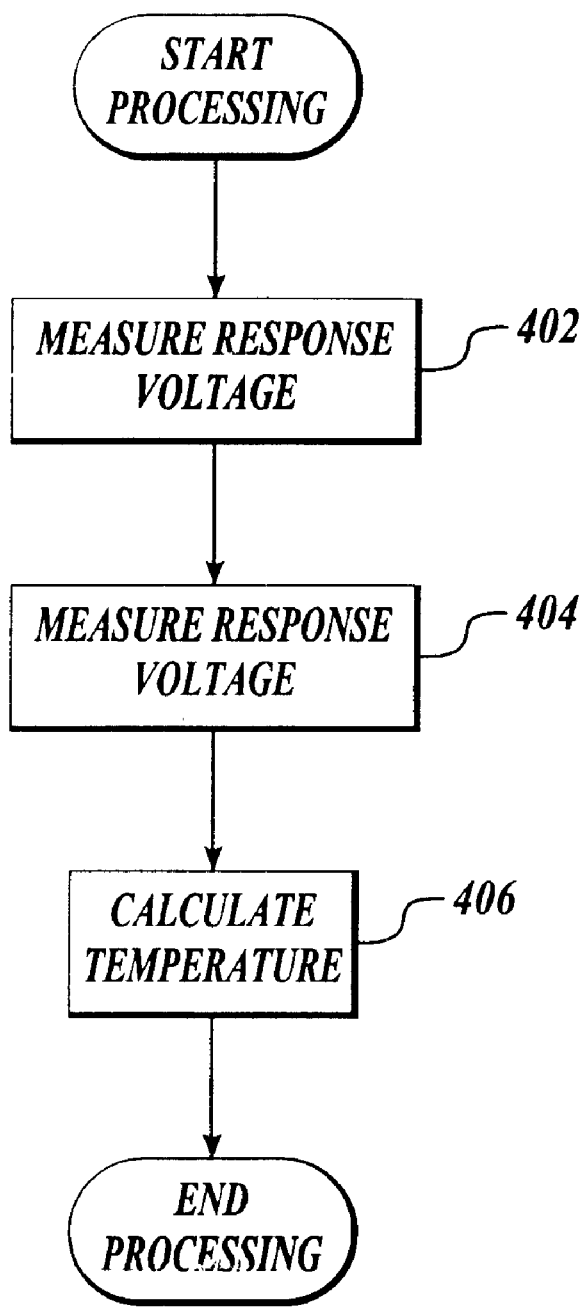
FIG. 4 is a flow diagram of an example method using a constant offset buffer to isolate an analog-to-digital converter from the temperature sensor in accordance with the present invention.

FIG. 4 is a flow diagram of an example method using a constant offset buffer to isolate an analog-to-digital converter from the temperature sensor in accordance with the present invention. Processing begins at block 402 (measure response voltage) where a first bias current is applied to the sensor. The response voltage to the first bias current is filtered, buffered, offset, and converted into a value such as a voltage or a digital code. The value is optionally stored in a memory. Processing proceeds from block 402 to block 404. In block 404 (measure response voltage), a second bias current is applied to the PN junction. Again, the response voltage from application of the second current to the sensor is filtered, buffered, offset, and converted into another value. Again, the value is optionally stored in a memory. Processing proceeds from block 404 to block 406. In block 406 (calculate temperature), the values from blocks 402 and 403 are used to calculate the temperature of the sensor. The method according to FIG. 4 may be repeated as necessary to determine temperature. A digital code may contain a sampling error of up to one least significant bit when the digital code is used to represent a value.

The measure response voltage procedure is described in further detail below with reference to FIG. 5. The calculate temperature procedure is described in further detail below with reference to FIG. 6.

Figure 5:
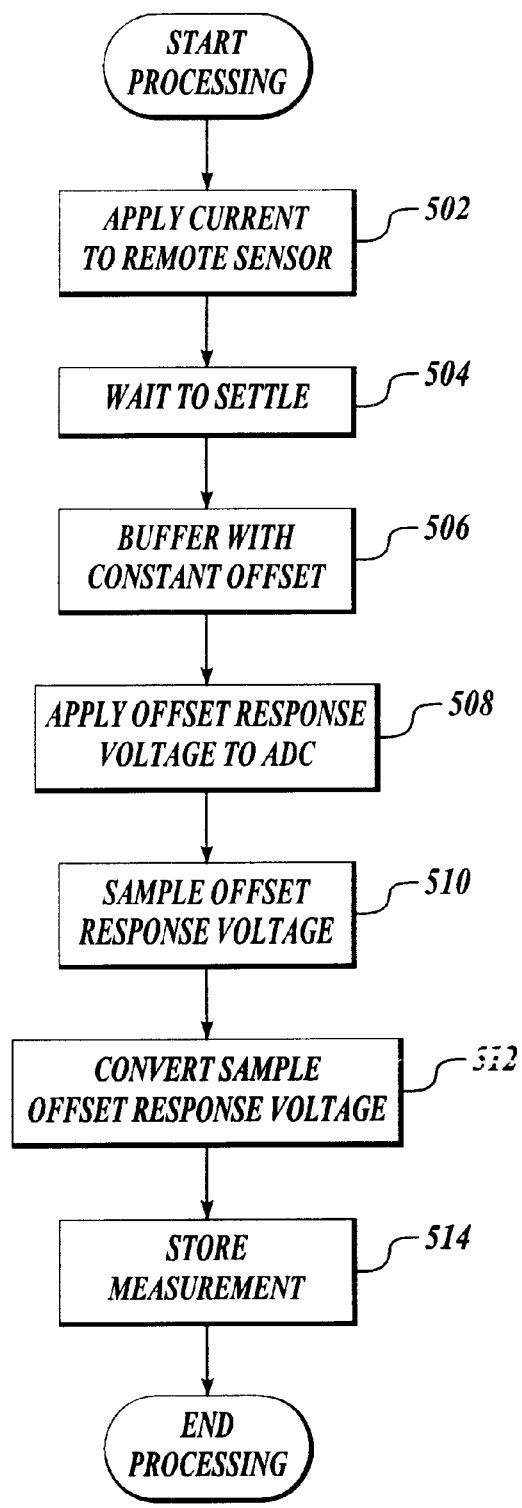
FIG. 5 is a flow diagram illustrating an example method for applying a bias current to the PN junction of a remote sensor and measuring the response voltage in accordance with the present invention.

FIG. 5 is a flow diagram illustrating an example procedure for measuring a response voltage from a temperature sensor. Beginning at block 502 (apply current to remote sensor), a first bias current is selected and applied to the remote sensor (120). Processing continues at block 504 (wait to settle) where the processing is delayed until a steady-state response voltage from the sensor is achieved. Proceeding to block 506 (buffer with constant offset), the response voltage is buffered and a constant offset voltage is added to the response voltage to produce an offset response voltage. Proceeding from block 506 to block 508 (apply offset response voltage to ADC), the offset response voltage is applied to the input of the ADC (114). Processing continues at block 510 (sample offset response voltage), where the offset response voltage is driven into the input impedance of the sampler in the ADC (114), and sampled. Proceeding from block 510 to block 512 (convert sample offset response voltage), the sample offset response voltage is converted to a value. The value may be provided to a controller (i.e., 116) or some other system that may utilize the data. Proceeding from block 512 to block 514 (store measurement), the controller (116) optionally stores the value obtained from the ADC (114) in the temperature log (118) or other suitable memory device.

The first and second applied bias currents from FIG. 4 can be processed in accordance with the steps described with reference to FIG. 5. In an example embodiment, the second bias current has a different current level with respect to the first bias current. Sequences containing first and second applied bias currents can be applied and measured iteratively before one or more temperature calculations dependent thereon are made.

Figure 6:
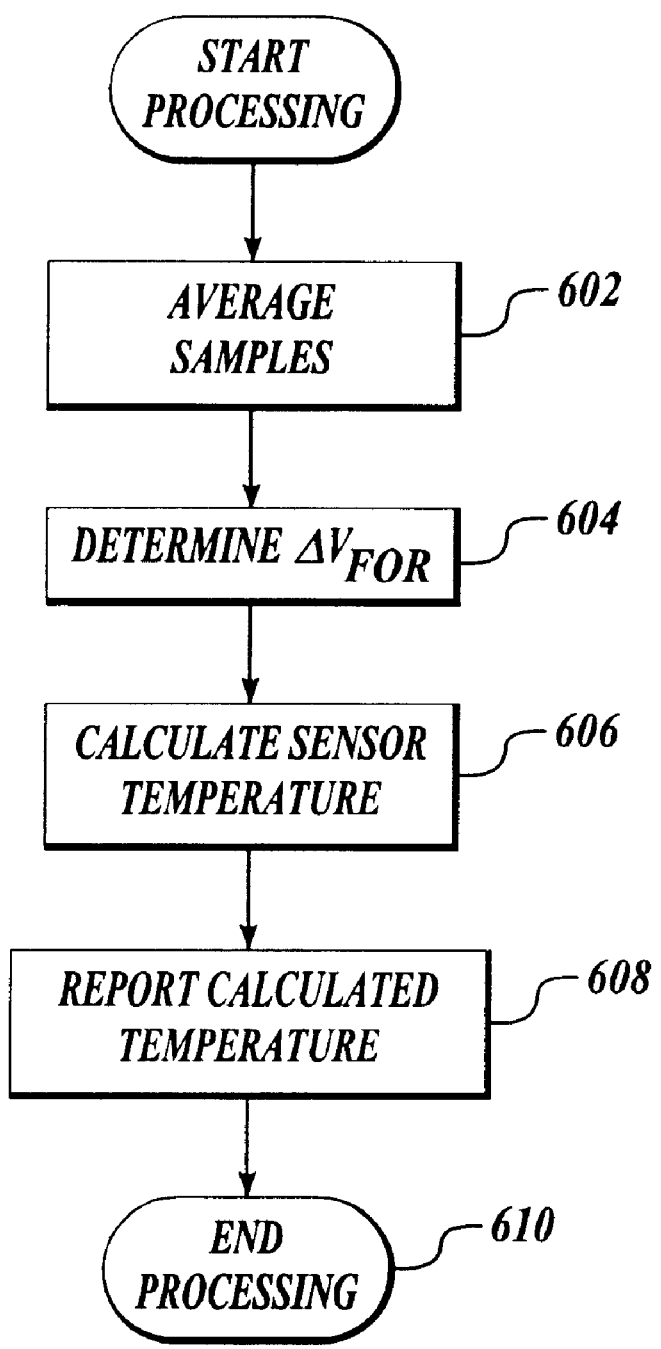
FIG. 6 is a flow diagram illustrating a method for calculating a temperature value for the PN junction in a remote sensor in accordance with the present invention.

FIG. 6 is a flow diagram illustrating a procedure for calculating a temperature of a remote sensor (120) in accordance with the present invention. Beginning at block 602 (average samples), a numeric average for the samples from each bias current in a segment of time is determined. The averages correspond to an average response voltage when the higher (or larger) bias current is applied to the sensor, and another average for the response voltage when the lower (or smaller) bias current is applied to the sensor. Processing continues at block 604 (determine $\Delta V_{for}$), where $\Delta V_{for}$ is determined by calculating the difference between the average response voltage from the higher bias current from the average response voltage from the lower bias current. Proceeding from block 604 to block 606 (calculate remote sensor temperature) the temperature for the sensor (120) is calculated using equation (I), described above. Proceeding from block 606 to block 608 (report calculated temperature), the calculated temperature is reported to another system or optionally stored in the temperature log (118) for further dissemination. Proceeding from block 608 to block 610, processing is terminated.

In one embodiment, the samples utilized in block 602 correspond to samples from a sequence of time-interleaved currents. For example, all samples associated with a 16× current that were made during a temperature measurement period are averaged together, and all samples associated with a 1× current that were made during the temperature measurement period are averaged together. In another embodiment, the samples may correspond to an oversampling of the response voltage from the remote sensor (120). Alternatively, the samples may also correspond to samples that are made when different current sources that have the same current density are applied in a sequence.

Certain calculations required by formula (I) may be calculated in advance in order to facilitate fast temperature calculations at runtime. For example, factors that remain constant may be calculated in advance for later use. In another example, constant factors that merely "scale" the resulting temperature may be left out of the calculation. Additionally, lookup tables can be used to perform calculations or determine various actions to be taken.

The determined sensor temperature from block 606 can be used for various purposes including instrumentation, control of a process for making articles of manufacture, monitoring the temperature of a processor, changing clock speeds of a processor, shutting down parts of a circuit to allow for cooling and power conservation, and the like.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of sampling a response voltage from a temperature sensor that includes a PN junction, the method comprising:

applying a first bias current to the temperature sensor such that the PN junction produces a first PN junction voltage, and the temperature sensor produces a first response voltage;

buffering the first response voltage to produce a first buffered response voltage with a buffer that has an associated constant offset voltage;

applying a second bias current to the temperature sensor such that the PN junction produces a second PN junction voltage, and the temperature sensor produces a second response voltage, wherein the second bias current is different than the first bias current;

buffering the second response voltage to produce a second buffered response voltage with the buffer; and converting the first and second buffered response voltages to corresponding values using a converter that has an associated input impedance that is isolated from the temperature sensor by the buffer such that a setup time associated with applying the first and second bias currents is minimized.

2. The method of claim 1, further comprising calculating a temperature associated with the temperature sensor from the values associated with the first and second buffered response voltages.

3. The method of claim 1, further comprising producing normalized values by subtracting another value from the values associated with the first and second buffered response voltages, wherein the another value corresponds to the constant offset voltage, such that the normalized values correspond to the respective first and second buffered response voltages which have the constant offset voltage removed.

4. The method of claim 3, further comprising calculating a temperature associated with the temperature sensor from the normalized values.

5. The method of claim 1, wherein the first bias current is greater than the second bias current.

6. The method of claim 1, wherein the first bias and the second bias current are related to one another by a ratio.

7. The method of 1, further comprising filtering the first and second response voltages with a low pass filter such that system noise effects are minimized.

8. An apparatus for sampling response voltages from a temperature sensor that includes a PN junction, comprising:
- a means for applying a first bias current that is arranged to apply a first bias current to the temperature sensor at a first time, such that the PN junction produces a first PN junction voltage, and the temperature sensor produces a first response voltage at the first time;
- a means for applying a second bias current that is arranged to apply a second bias current to the temperature sensor at a second time that is different from the first time, such that the PN junction produces a second PN junction voltage that is different from the first PN junction voltage, and the temperature sensor produces a second response voltage at the second time;
- a means for buffering that is arranged to buffer response voltages from the temperature sensor and provide buffered response voltages that have a constant offset, such that the buffered response voltage is one of a first buffered response voltage and a second buffered response voltage when the response voltage is a corresponding one of the first and second response voltages; and
- a means for converting that is arranged to convert the first and second buffered response voltages to values, wherein the means for converting has an associated input impedance that is isolated from the temperature sensor by the means for buffering such that loading effects associated with the temperature sensor are minimized.

9. The apparatus of claim 8, further comprising a means for calculating a temperature that is arranged to calculate a temperature associated with the temperature sensor using the values.

10. The apparatus of claim 8, further comprising a means for subtracting that is arranged to provide normalized values by subtracting another value from the values such that the associated offset is removed.

11. The apparatus of claim 10, further comprising a means for calculating that is arranged to calculate a temperature associated with the temperature sensor using the normalized values.

12. The apparatus of claim 8, wherein the first bias current is greater than the second bias current.

13. The apparatus of claim 8, further comprising a means for filtering that is arranged to filter system noise from the response voltages.

14. An apparatus for sampling response voltages from a temperature sensor that includes a semiconductor sensor, comprising:
- a programmable current source that is configured to provide a bias current to the temperature sensor such that the temperature sensor provides a response voltage, wherein the bias current corresponds to a selected one of a first current and a second current that is different from the first current;
- a buffer that is configured to provide a buffered response voltage in response to the response voltage, wherein the buffer has an associated offset voltage that is substantially constant; and
- an analog-to-digital converter that is configured to sample the buffered response voltage and provide a value that corresponds to a quantized buffered response voltage, wherein the buffer is arranged to isolate the temperature sensor from the analog-to-digital converter such that a set-up time is minimized.

15. The apparatus of claim 14, further comprising a subtracter that is configured to subtract a value that corresponds to the offset voltage from the value to provide a normalized value.

16. The apparatus of claim 14, further comprising a capacitor that is coupled to the temperature sensor such that common mode noise in the response voltage is reduced.

17. The apparatus of claim 14, wherein the temperature sensor includes a PN junction.

18. The apparatus of claim 14, further comprising a bias circuit that is configured to control a bias voltage associated with the temperature sensor.

19. The apparatus of claim 14, wherein the temperature sensor is configured to monitor a temperature associated with a microprocessor.

* * * * *